US011274828B2

(12) United States Patent
Ding

(10) Patent No.: US 11,274,828 B2
(45) Date of Patent: Mar. 15, 2022

(54) ARTICLE WITH BOND COAT LAYER AND LAYER OF NETWORKED CERAMIC NANOFIBERS

(71) Applicant: United Technologies Corporation, Farmington, CT (US)

(72) Inventor: Zhongfen Ding, South Windsor, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 313 days.

(21) Appl. No.: 16/270,645

(22) Filed: Feb. 8, 2019

(65) Prior Publication Data

US 2020/0256562 A1 Aug. 13, 2020

(51) Int. Cl.
*F23R 3/00* (2006.01)
*C04B 35/10* (2006.01)
(Continued)

(52) U.S. Cl.
CPC .............. *F23R 3/002* (2013.01); *C04B 35/10* (2013.01); *C04B 35/48* (2013.01); (Continued)

(58) Field of Classification Search
CPC ........ F23R 3/007; F23R 3/002; C04B 41/522; C04B 20/0036; C04B 35/10; C04B 35/48; C04B 35/62222; C04B 35/6225; C04B 2235/3217; C04B 2235/3244; C04B 2235/5236; C04B 2235/5264; C23C 28/2455; C23C 28/3215; C23C 28/345; C23C 28/3455; C23C 28/36; C23C 4/11; C23C 4/18; C23C 24/00; C23C 4/10; B23B 27/20; F02K 3/04; F05D 2300/2112; F05D 2300/2118; F05D 2300/614; Y02T 50/60; F01D 5/288
See application file for complete search history.

(56) References Cited

U.S. PATENT DOCUMENTS 5,824,423 A * 10/1998 Maxwell ............... C23C 28/321
428/623
6,098,397 A * 8/2000 Glezer .................... F23R 3/002
60/752
(Continued)

FOREIGN PATENT DOCUMENTS

CN 108754495 11/2018
EP 1939317 7/2008
WO WO-2018087452 A1 * 5/2018 ......... C04B 41/5042

OTHER PUBLICATIONS

Wang, H., Zhang, X., Wang, N., Li, Y., Feng, X., Huang, Y., and Zhao, C. et al. (2017). Ultralight, scalable, and high-temperature-resilient ceramic nanofiber sponges. Science Advances. Issue 3. Jun. 2, 2017.

(Continued)

*Primary Examiner* — Gerald L Sung
*Assistant Examiner* — Rene D Ford
(74) *Attorney, Agent, or Firm* — Carlson, Gaskey & Olds, P.C.

(57) ABSTRACT

An article includes a substrate, a bond coat layer disposed on the substrate, and a layer of networked ceramic nanofibers disposed on the bond coat layer.

16 Claims, 3 Drawing Sheets

(51) Int. Cl.

| | |
|---|---|
| ***C04B 35/48*** | (2006.01) |
| ***C04B 35/622*** | (2006.01) |
| *F02K 3/04* | (2006.01) |

(52) U.S. Cl.

CPC .... *C04B 35/6225* (2013.01); *C04B 35/62222* (2013.01); *C04B 2235/3217* (2013.01); *C04B 2235/3244* (2013.01); *C04B 2235/5236* (2013.01); *C04B 2235/5264* (2013.01); *F02K 3/04* (2013.01); *F05D 2300/2112* (2013.01); *F05D 2300/2118* (2013.01)

(56) References Cited

U.S. PATENT DOCUMENTS

| | | | | |
|---|---|---|---|---|
| 8,221,825 | B2 | 7/2012 | Reitz et al. | |
| 8,821,116 | B2 | 9/2014 | Duval et al. | |
| 2017/0179445 | A1 | 6/2017 | Fetsko et al. | |
| 2019/0256983 | A1* | 8/2019 | Joulia | C04B 41/87 |

OTHER PUBLICATIONS

European Search Report for European Patent Application No. 20156422.6 completed May 12, 2020.

* cited by examiner

ARTICLE WITH BOND COAT LAYER AND LAYER OF NETWORKED CERAMIC NANOFIBERS

BACKGROUND

Gas turbine engine components in the core gaspath may be subject to temperatures in excess of the melting temperature of the component substrate. Cooling features and barrier coatings are used to protect the substrate from these extreme temperatures. Barrier coatings are typically formed of ceramic materials, such as yttria stabilized zirconia or gadolinium zirconate. A thermally grown oxide layer is provided on the substrate as a bond coat to enhance bonding of the barrier layer on the substrate.

SUMMARY

An article according to an example of the present disclosure includes a substrate, a bond coat layer disposed on the substrate, and a layer of networked ceramic nanofibers disposed on the bond coat layer.

In a further embodiment of any of the foregoing embodiments, the ceramic nanofibers include zirconium oxide.

In a further embodiment of any of the foregoing embodiments, the ceramic nanofibers are selected from the group consisting of yttria stabilized zirconia, gadolinia zirconate, and combinations thereof.

In a further embodiment of any of the foregoing embodiments, the bond coat layer is MCrAlY.

In a further embodiment of any of the foregoing embodiments, the bond coat layer includes aluminum oxide.

In a further embodiment of any of the foregoing embodiments, the substrate is a metal alloy.

In a further embodiment of any of the foregoing embodiments, the layer of networked ceramic nanofibers has a thickness of 1 micrometer to 50 micrometers.

In a further embodiment of any of the foregoing embodiments, the thickness is from 5 micrometer to 25 micrometers.

A further embodiment of any of the foregoing embodiments includes a ceramic barrier coating disposed on the layer of the networked ceramic nanofibers.

In a further embodiment of any of the foregoing embodiments, the ceramic barrier coating is selected from the group consisting of yttria stabilized zirconia, gadolinia zirconate, and combinations thereof.

In a further embodiment of any of the foregoing embodiments, the layer of networked ceramic nanofibers includes an inner sub-layer that is porous and outer surface sub-layer that is densified.

A combustor according to an example of the present disclosure includes at least one fuel injector, a combustion chamber, and a combustor wall at least partially bounding the combustion chamber. The combustor wall has a substrate, a bond coat layer disposed on the substrate, and a layer of networked ceramic nanofibers disposed on the bond coat layer.

In a further embodiment of any of the foregoing embodiments, the ceramic nanofibers include zirconium oxide.

In a further embodiment of any of the foregoing embodiments, the ceramic nanofibers are selected from the group consisting of yttria stabilized zirconia, gadolinia zirconate, and combinations thereof.

In a further embodiment of any of the foregoing embodiments, the bond coat layer is MCrAlY.

In a further embodiment of any of the foregoing embodiments, the bond coat layer includes aluminum oxide.

In a further embodiment of any of the foregoing embodiments, the substrate is a metal alloy.

A further embodiment of any of the foregoing embodiments includes a ceramic barrier coating disposed on the layer of the networked ceramic nanofibers. The ceramic barrier coating is selected from the group consisting of yttria stabilized zirconia, gadolinia zirconate, and combinations thereof.

In a further embodiment of any of the foregoing embodiments, the layer of networked ceramic nanofibers includes an inner sub-layer that is porous and outer surface sub-layer that is densified.

A method of fabricating an article according to an example of the present disclosure includes providing a substrate and a bond coat layer disposed on the substrate, and depositing by blow-spinning a layer of networked ceramic nanofibers on the bond coat layer.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
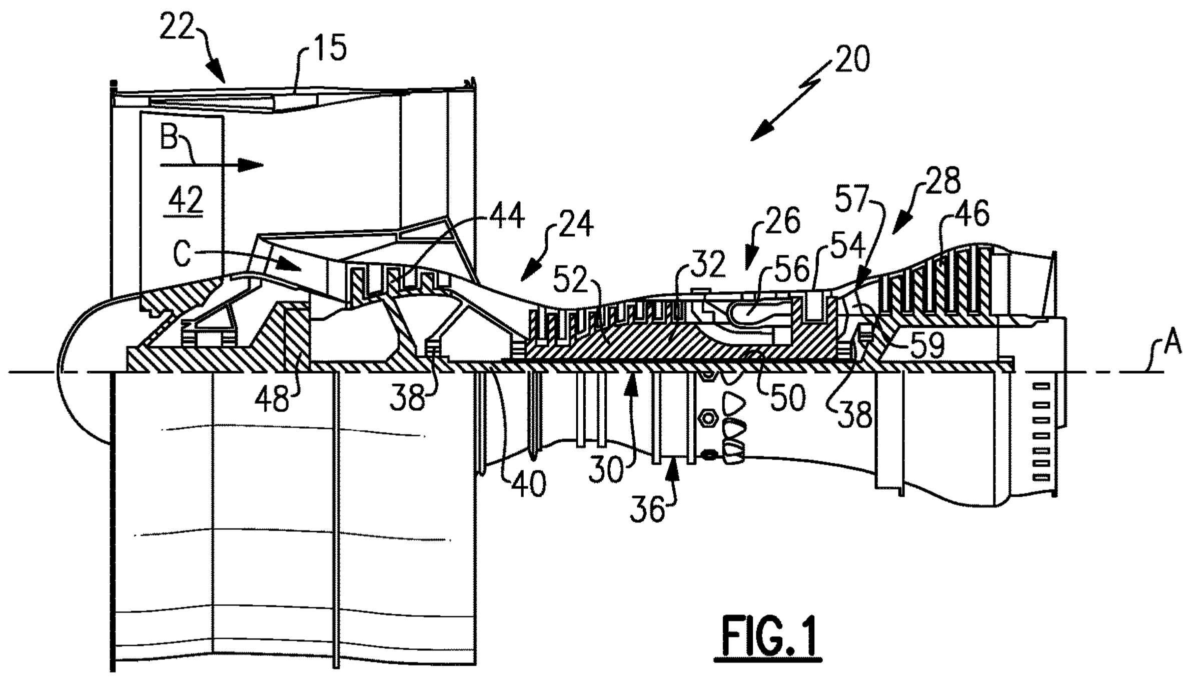
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

Figure 2:
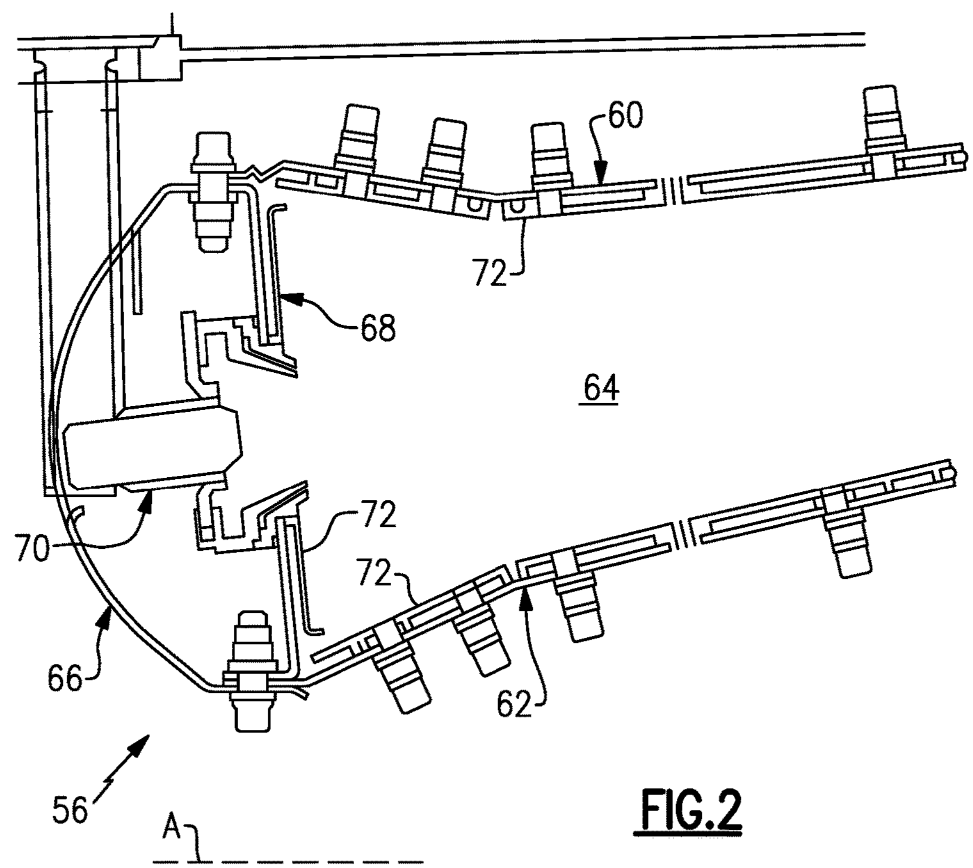
FIG. 2 illustrates an example article.

FIG. 2 shows a representative sectioned view of the combustor 56. In this example, the combustor 56 includes an annular outer shell 60, an annular inner shell 62 that is spaced radially inwards of the annular outer shell 60 to define an annular combustion chamber 64 there between. The annular outer shell 60 and the annular inner shell 62 are joined with an annular hood 66 and a bulkhead 68 that each extend circumferentially around the engine central longitudinal axis A. Of course, the specific design of the combustor 56 may differ from the illustrated, non-limiting example.

The combustor 56 receives a fuel supply through a fuel nozzle or injector 70. The fuel supply is ignited and injected into the combustion chamber 64. To resist the high combustion temperatures, the annular outer shell 60, the annular inner shell 62 and the bulkhead 68 can include heat shield panels or walls 72 that bound the combustion chamber 64. The heat shield panels or walls 72 are an example of an article according to the present disclosure. It is to be understood that, although the examples herein may be described with reference to the combustor 56 and heat shield panels or walls 72, this disclosure is also applicable to other gas turbine engine components.

The heat shield panel or wall 72 is subjected during use to extreme temperatures in the engine 20. As described below, the heat shield panel or wall 72 includes a coating system to protect against the high temperatures and environmental effects that might otherwise damage the heat shield panel or wall 72.

Figure 3:
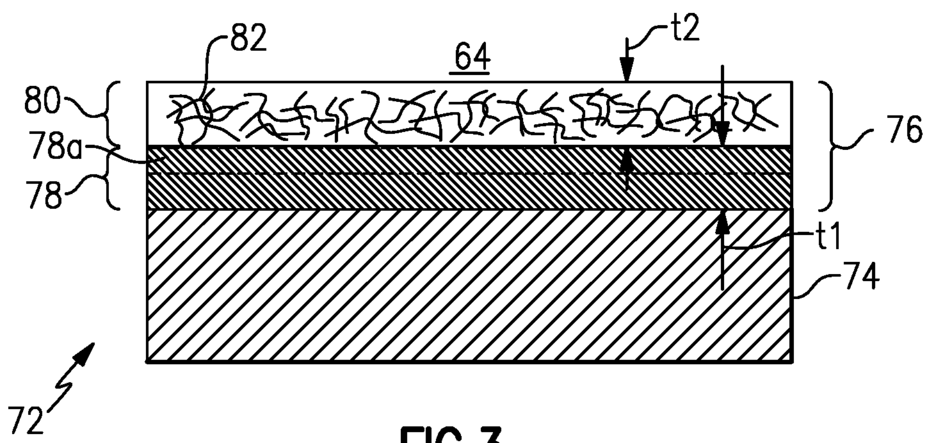
FIG. 3 illustrates a sectioned view through an article that has a layer of networked ceramic nanofibers.

FIG. 3 illustrates a sectioned view through a representative portion of the heat shield panel or wall 72 (hereafter "wall 72"). The gaspath side of the wall 72 faces into the combustion chamber 64. The wall 72 is formed of a substrate 74. Most typically, the substrate 74 will be formed of a superalloy, such as a nickel- or cobalt-based alloy. Alternatively, the substrate 74 may be formed of a ceramic or ceramic composite material.

There is a conformal coating system 76 disposed on the gaspath side of the substrate 74. In this example, the coating system 76 includes a bond coat layer 78 disposed on the substrate 74 and a layer 80 of networked ceramic nanofibers 82 is disposed on the bond coat layer 78. In this example, the bond coat layer 78 is in direct contact with the substrate 74 and the layer 80 is in direct contact with the bond coat layer 78.

The bond coat layer 78 serves to facilitate bonding of the layer 80 of networked ceramic nanofibers 82 on the substrate 74. In this regard, the composition of the bond coat layer 78 may be selected in cooperation with the compositions of the substrate 74 and the layer 80 of networked ceramic nanofibers 82. In one example, the bond coat layer 78 is MCrAlY, where M is at least one of nickel, iron, or cobalt, Cr is chromium, Al is aluminum, and Y is yttrium. Alternatively, the bond coat layer 78 may be composed of a different alloy composition or a ceramic composition. The aluminum of the MCrAlY forms thermally grown aluminum oxide sub-layer 78*a*, which may be desirable as a passive oxygen barrier and to promote bonding of ceramic compositions of the layer 80 of networked ceramic nanofibers 82.

Figure 4:
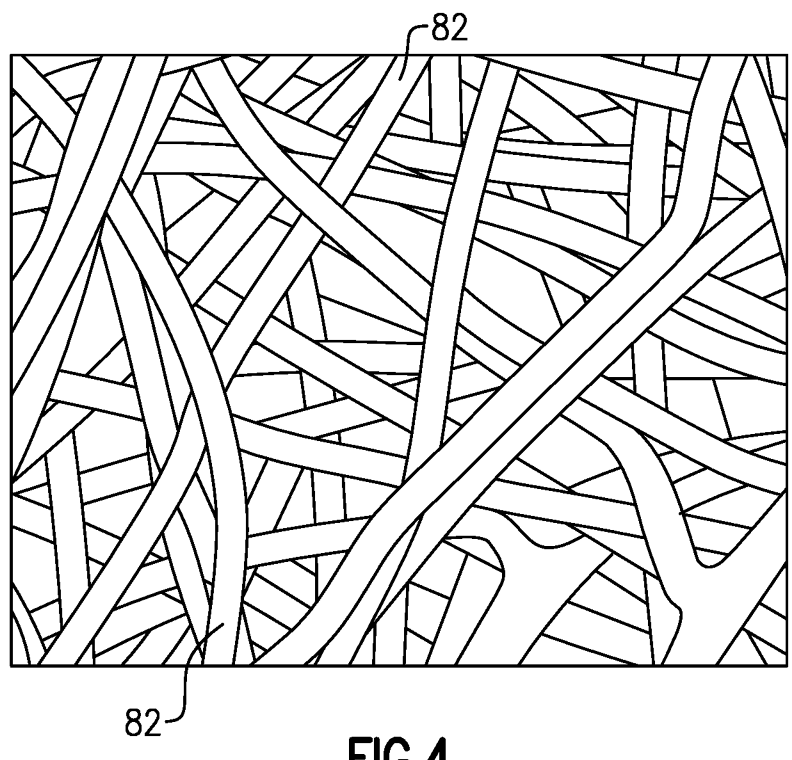
FIG. 4 illustrates a magnified view of networked ceramic nanofibers.

FIG. 4 illustrates a magnified view of the networked ceramic nanofibers 82. The nanofibers 82 are elongated, randomly oriented filaments that have a maximum diameter of 1 nanometer to 500 nanometers. More typically, the diameter will be 1 nanometer to 250 nanometers, 1 nanometer to 100 nanometers, or 1 nanometer to 50 nanometers. The filaments are non-linear and curve or turn such that the filaments are intertwined to form a tangled porous network. As used herein, "networked" refers to the intertwining of the fibers or filaments. Where the filaments contact each other, they may be bonded together as a result of the process used to form the layer 80 of networked ceramic nanofibers 82. The pores between the filaments are void and thus do not contain any fillers or matrix material.

The nanofibers 82 are formed of a ceramic, such as an oxide. In one example, the ceramic is zirconium oxide. For instance, the zirconium oxide may be a stabilized or partially stabilized zirconia, such as yttrium stabilized zirconia or gadolinia stabilized zirconia, or a zirconate that is doped with a rare earth stabilizer, such as yttria or gadolinia.

The layer 80 of networked ceramic nanofibers 82 facilitate thermal sealing of the bond coat layer 78 and substrate 74. For instance, although the layer 80 of networked ceramic nanofibers 82 is porous, the networked ceramic nanofibers 82 provide a sponge-like structure of relatively small pores that provides superior thermal insulation. As an example based on zirconia, the layer 80 of networked ceramic nanofibers 82 may have a thermal conductivity of approximately 0.027 Watts per meter-Kelvin.

Additionally, the pores of the layer 80 of networked ceramic nanofibers 82 may serve to block debris or foreign material (e.g., steam, vapor, calcium-magnesium-alumino-silicate or "CMAS") that might otherwise infiltrate to the bond coat layer 78. The filaments of the networked ceramic nanofibers 82 are also flexible and tolerant to thermal mechanical strain. The flexibility of the filaments may further facilitate entrapment of foreign particles, debris, or materials, as well as act as "bumper" to absorb impact of particles and debris. The layer 80 of networked ceramic nanofibers 82 thereby provides thermal and physical sealing/protection.

It is further noted that MCrAlY has been used as a bond coat for some known thermal barrier coatings, such as those deposited by physical vapor deposition. In those instances, there is a substantially continuous interface for bonding between the bond coat and the thermal barrier coating. The layer 80 of networked ceramic nanofibers 82, however, is of relatively high porosity and is of different structure than known thermal barrier coatings. Furthermore, networked ceramic nanofibers are not known for being produced on solid structures like the bond coat layer 78. Rather, networked ceramic nanofibers have been produced in a screen-like cage structure. As a result, use of an MCrAlY bond coat has not been suggested in combination with a layer of networked ceramic nanofibers, nor have the thermal and physical sealing benefits of a layer of ceramic nanofibers been realized for protection of a substrate and bond coat layer.

Figure 5:
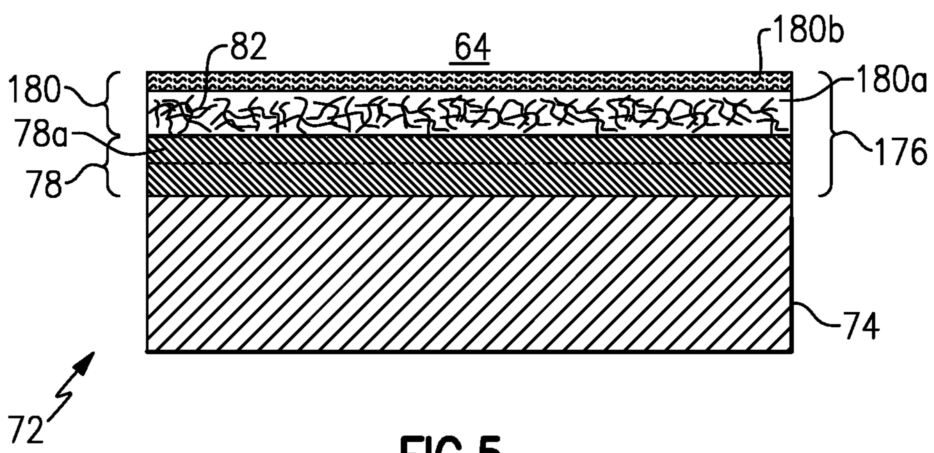
FIG. 5 illustrates a sectioned view through an article in which the layer of networked ceramic nanofibers has a densified outer surface sub-layer.

FIG. 5 illustrates another example of a coating system 176 on the substrate 74. In this disclosure, like reference numerals designate like elements where appropriate and reference numerals with the addition of one-hundred or multiples thereof designate modified elements that are understood to incorporate the same features and benefits of the corresponding elements. In this example, the coating system 176 includes a layer 180 of the networked ceramic nanofibers 82. The layer 180 of the networked ceramic nanofibers 82 includes an inner sub-layer **180*a* and an outer surface sub-layer 180*b*. The "inner" and "outer" are reference to the combustion chamber 64 or, if the article is not in a combustor, a hot side of the article. That is, the outer surface sub-layer 180*b*** faces the hot gaspath.

Figure 6:
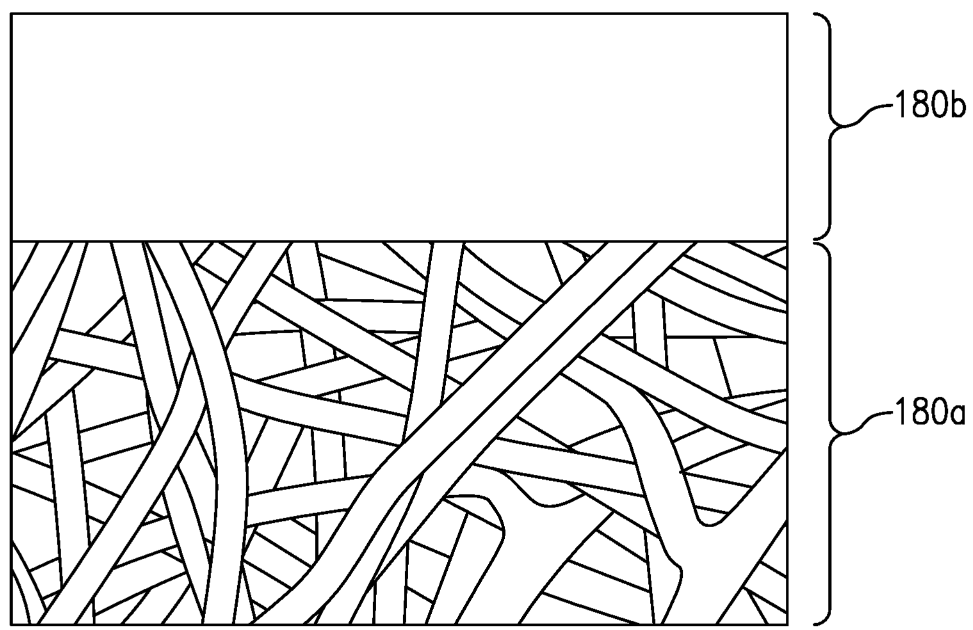
FIG. 6 illustrates networked ceramic nanofibers with a densified outer surface sub-layer.

Referring also to FIG. 6, the inner sub-layer **180*a* is formed of the nanofibers 82 as described above and is porous. The outer surface sub-layer 180*b*, however, is densified to provide additional sealing. For example, the outer surface sub-layer 180*b* may be formed using a fusion process in which an energy beam, such as a laser beam, melts the nanofibers 82 in the near surface region. The melt consolidates upon solidification, thereby providing a solid or low-porosity sub-layer. This solid or low-porosity sub-layer has a porosity that is substantially lower than the inner-sub-layer 180*a*. For example, the percent porosity of the inner sub-layer 180*a* may differ from that of the outer surface sub-layer 180*b* by a factor of at least 2, but more typically by at least 5 or at least 10, and up to a factor of about 25. The relatively low porosity of the outer surface sub-layer 180*b* serves to block debris or foreign material that might otherwise infiltrate into the layer 180 and the bond coat layer 78**.

Figure 7:
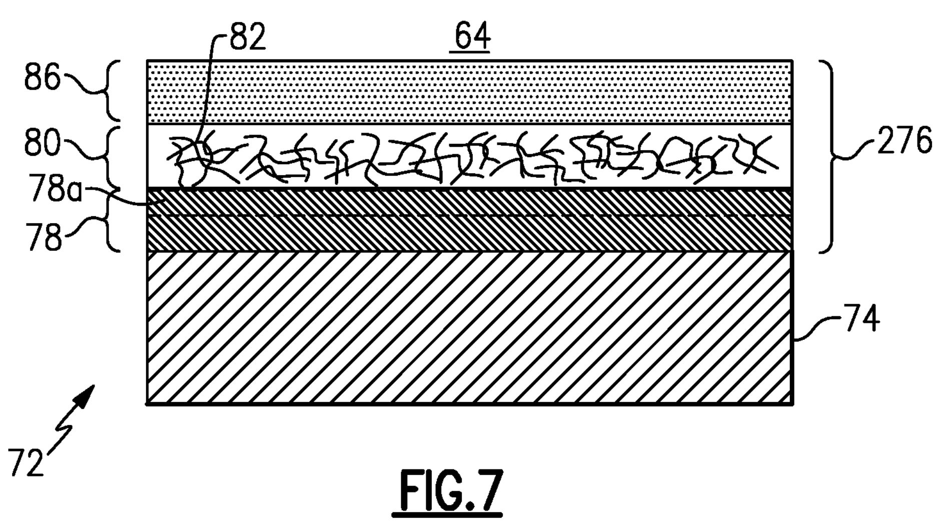
FIG. 7 illustrates a sectioned view of an article that has a ceramic thermal barrier layer on the layer of networked ceramic nanofibers and a ceramic thermal barrier layer.

FIG. 7 illustrates another example of the coating system 276 on the substrate 74. In this example, the coating system 276 is similar to the coating system 76 but additionally includes a ceramic barrier layer 86 disposed on the layer 80 of networked ceramic nanofibers 82. The ceramic barrier layer 86 serves a similar function as the outer surface sub-layer **180*b* of the prior example, to provide additional sealing by blocking debris or foreign material. The ceramic barrier layer 86** may also serve to provide additional thermal sealing.

As an example, the ceramic barrier layer 86 is formed primarily of zirconium oxide. For instance, the zirconium oxide may be a stabilized or partially stabilized zirconia, such as yttrium stabilized zirconia or gadolinia stabilized zirconia, or a zirconate that is doped with a stabilizer, such as yttria, gadolinia, cerium, titanium, or combinations thereof. The ceramic barrier layer 86 may, for example, be deposited by plasma spray or physical vapor deposition. Air plasma spray may be desirable for providing low porosity.

Due to the thermal insulation and sealing provided by the layer 80 of networked ceramic nanofibers 82, the layer 80 of networked ceramic nanofibers 82 can be relatively thin, yet achieve similar overall performance to a thicker traditional ceramic thermal barrier coating. Use of the thin layer 80 of networked ceramic nanofibers 82 may also reduce weight in comparison to thicker thermal barrier coatings.

In any of the above examples, the layer 80 of networked ceramic nanofibers 82 may have a thickness of 1 micrometer to 50 micrometers. Most typically, however, the thickness will be from 5 micrometer to 25 micrometers. The thickness is less than the thickness of the bond coat layer 78. For instance, the bond coat layer 78 may have a thickness t1 (FIG. 1) and the layer 80 of networked ceramic nanofibers 82 may have a thickness t2, where t2 is less than t1 by a factor of at least 2. Most typically, the bond coat layer 78 will have a thickness of approximately 100 micrometers. A traditional ceramic thermal barrier coating has a thickness of approximately 100 micrometers to 500 micrometers, or approximately 250 micrometers. The thickness of the layer 80 of networked ceramic nanofibers 82 may be adjusted to control the thermal and physical sealing described above.

The layer 80 of networked ceramic nanofibers 82 may be fabricated directly on to the bond coat layer 78. For example, the process may include first providing the substrate 74 and bond coat layer 78. For instance, the substrate 74 may be formed in a prior process and the bond coat layer 78 deposited thereon prior to the application of the layer 80 of networked ceramic nanofibers 82. The layer 80 of networked ceramic nanofibers 82 may then be deposited by a blow-spinning process. Blow-spinning involves spraying a precursor solution through an inner nozzle while flowing a process gas from an outer concentric nozzle such that the precursor when sprayed elongates into ultra-thin filaments. The filaments deposit on the bond coat layer 78 and, after further processing, are converted into the ceramic nanofibers. The precursor solution includes binders and salts of the constituents that will form the ceramic, such as zirconium, oxygen, and any dopants. An example binder includes polyvinylpyrrolidone, and example salts may include aqueous oxynitrate, nitrate, nitrite, or chloride salts of zirconium and the selected dopants, zirconyl chloride, or metal organics such as zirconium isobutoxide or isopropoxide in a solvent. The amounts of the constituents may be controlled in order to control the final composition of the ceramic nanofibers. After spinning, the filaments are then thermally treated to remove binders, etc. and consolidate the ceramic. It is during the thermal treatment that the filaments may diffuse and thereby bond together where they are in contact.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature.

Variations and modifications to the disclosed examples may become apparent to those skilled in the art that do not necessarily depart from this disclosure. The scope of legal protection given to this disclosure can only be determined by studying the following claims.

What is claimed is:

1. An article comprising:

a substrate;

a bond coat layer disposed on the substrate; and a layer of networked ceramic nanofibers disposed on the bond coat layer, the networked ceramic nanofibers being comprised of filaments that define pores there between and the pores are void, the layer of networked ceramic nanofibers including an inner sub-layer that has the pores that are void and an outer surface sub-layer in which the networked ceramic nanofibers are melt-consolidated as a solid.

2. The article as recited in claim 1, wherein the ceramic nanofibers include zirconium oxide.

3. The article as recited in claim 1, wherein the ceramic nanofibers are selected from the group consisting of yttria stabilized zirconia, gadolinia zirconate, and combinations thereof.

4. The article as recited in claim 1, wherein the substrate is a metal alloy, the bond coat layer is MCrAlY.

5. The article as recited in claim 1, wherein the bond coat layer includes aluminum oxide.

6. The article as recited in claim 1, wherein the layer of networked ceramic nanofibers has a thickness of 1 micrometer to 50 micrometers.

7. The article as recited in claim 6, wherein the thickness is from 5 micrometers to 25 micrometers.

8. The article as recited in claim 1, further comprising a ceramic barrier coating disposed on the layer of the networked ceramic nanofibers.

9. The article as recited in claim 8, wherein the ceramic barrier coating is selected from the group consisting of yttria stabilized zirconia, gadolinia zirconate, and combinations thereof.

10. The article as recited in claim 1, wherein the inner sub-layer has a first percent porosity and the outer surface sub-layer has a second percent porosity that is less than the first percent porosity by a factor of 5 to 25.

11. A combustor comprising:

at least one fuel injector;

a combustion chamber; and a combustor wall at least partially bounding the combustion chamber, the combustor wall including, a substrate, a bond coat layer disposed on the substrate, and a layer of networked ceramic nanofibers disposed on the bond coat layer, the networked ceramic nanofibers being comprised of filaments that define pores there between and the pores are void, the layer of networked ceramic nanofibers including an inner sub-layer that has the pores that are void and an outer surface sub-layer in which the networked ceramic nanofibers are melt-consolidated as a solid.

12. The combustor as recited in claim 11, wherein the ceramic nanofibers include zirconium oxide.

13. The combustor as recited in claim 11, wherein the substrate is a metal alloy, the ceramic nanofibers are selected from the group consisting of yttria stabilized zirconia, gadolinia zirconate, and combinations thereof, the bond coat layer is MCrAlY.

14. The combustor as recited in claim 11, wherein the bond coat layer includes aluminum oxide.

15. The combustor as recited in claim 11, further comprising a ceramic barrier coating disposed on the layer of the networked ceramic nanofibers, the ceramic barrier coating being selected from the group consisting of yttria stabilized zirconia, gadolinia zirconate, and combinations thereof.

16. A method of fabricating an article, the method comprising:

providing a substrate and a bond coat layer disposed on the substrate; and depositing by blow-spinning a layer of networked ceramic nanofibers on the bond coat layer, the networked ceramic nanofibers are comprised of filaments that define pores there between and the pores are void; and melt-consolidating a portion of the layer of networked ceramic nanofibers such that the layer of networked ceramic nanofibers includes an inner sub-layer that has the pores that are void and an outer surface sub-layer in which the networked ceramic nanofibers are melt-consolidated as a solid.

* * * * *